Jan. 22, 1952   ACHILLE CARLO SAMPIETRO   2,583,124
KNOWN AS
ACHILLES CHARLES SAMPIETRO
ROTARY ANNULAR ELECTROMAGNET

Filed June 30, 1950                             2 SHEETS—SHEET 1

Inventor
ACHILLE CARLO SAMPIETRO.
KNOWN AS ACHILLES CHARLES SAMPIETRO.
By Ralph B. Stewart
attorney Jan. 22, 1952    ACHILLE CARLO SAMPIETRO    2,583,124
KNOWN AS
ACHILLES CHARLES SAMPIETRO
ROTARY ANNULAR ELECTROMAGNET Filed June 30, 1950    2 SHEETS—SHEET 2

Inventor
ACHILLE CARLO SAMPIETRO,
KNOWN AS ACHILLES CHARLES SAMPIETRO
By Ralph B. Stewart
Attorney Patented Jan. 22, 1952

2,583,124

UNITED STATES PATENT OFFICE 2,583,124

ROTARY ANNULAR ELECTROMAGNET

Achille Carlo Sampietro, known as Achilles Charles Sampietro, London, England, assignor to D. R. Robertson Limited, London, England, a company of Great Britain Application June 30, 1950, Serial No. 171,311
In Great Britain July 4, 1949

5 Claims. (Cl. 172—284)

1

This invention relates to electromagnets of the kind having an annular magnetic core the section of which partly surrounds the section of an annular exciting winding, the electromagnet forming a rotary part of a dynamo-electric machine in which it is set coaxially. Such magnets are used, for example, in clutches and brakes for transmitting and restraining rotary motion, and in high-frequency alternators.

In such magnets there is a tendency for the winding to move owing to its inertia relatively to the core, particularly when the magnet is subjected to torsional vibration or high values of angular acceleration, and an object of this invention is to overcome this tendency.

Another object is to provide a simple and effective arrangement for electrically connecting one or both terminals of the winding to a slip ring or slip rings.

According to this invention, in an electromagnet of the kind referred to, the winding consists of or includes a strip of metal wound into a tight spiral to form a ring coil of rectangular section in which the turns are separated by insulation, and the coil is locked to an adjacent surface of the magnetic core by at least one key of insulating material disposed at least in part radially and engaged in keyways formed in a side of the coil and in the core. A plurality of such keys are preferably uniformly distributed around the coil.

The winding may consist of two such coils wound in spirals of opposite hand and placed side by side in an annular groove of rectangular channel section opening radially outwards in the core, each coil being keyed to the adjacent wall of the channel, the outer ends of the two coils being electrically bonded together, and the inner ends of the two coils forming the terminals of the winding.

Also according to this invention, a method of making an exciting winding for an electromagnet of the kind referred to includes the steps of winding a strip of metal and a strip of insulating material together into a two-start spiral to form a ring coil, impregnating the insulating material (either before or after winding) with a thermosetting insulating medium, baking the coil to set the said medium, and thereafter machining at least one keyway disposed at least in part radially in a side of the coil.

Further according to this invention, a connection for the radially inner terminal of the ring coil includes a terminal block to which the inner end of a conductor strip is bonded and which

2 lies in an axially disposed channel opening in a cylindrical surface of the core around which the coil is disposed, a conductor member, e. g. a slip ring, adjacent to a side wall of the core, and a conducting tie passing through said side wall and engaged in said terminal block and said conductor member, the terminal block, the tie and the conductor member being insulated from the core. The tie may be a differential screw engaged in two screw-threaded holes of different diameters and pitches in the terminal block and conductor member respectively.

An embodiment of the invention as applied to the field element of an eddy-current clutch will now be described, by way of example, with reference to the accompanying drawings wherein:

Figure 4 is a section taken along the line 4—4 in Figure 3.

Figure 6 is a plan view of a key.

Figure 7 is an elevational view of the key.

Figure 1:
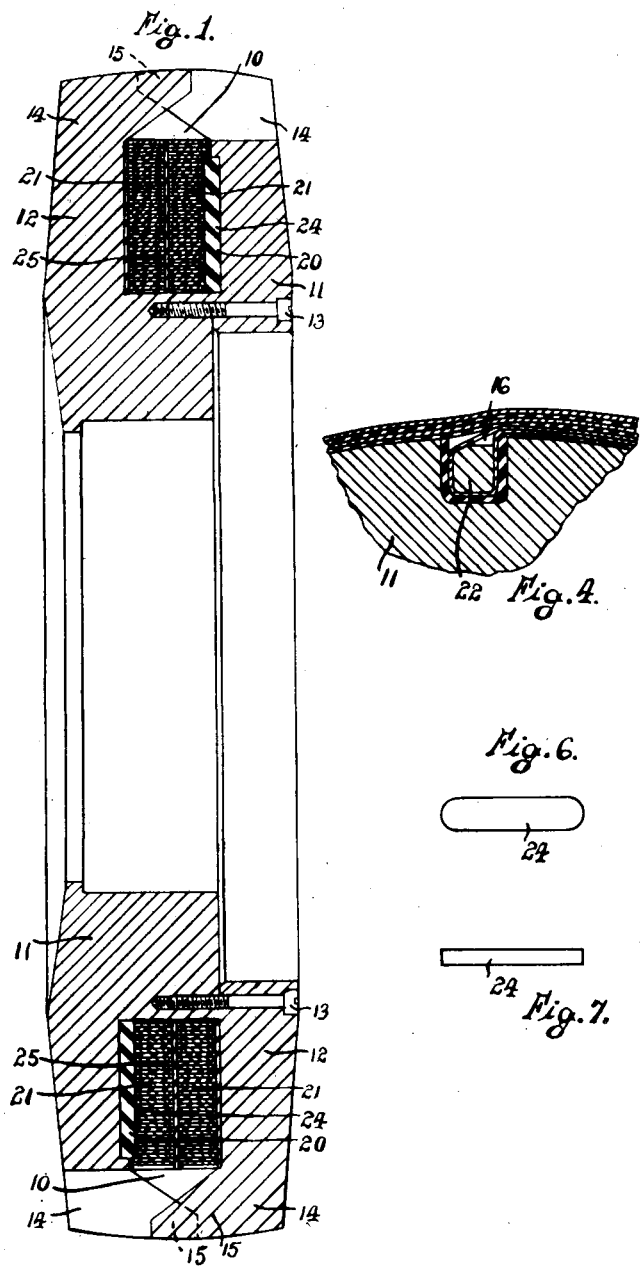
Figure 1 is a section through a field element of an eddy current clutch.

The field element includes a magnetic core having an annular groove 10 of rectangular channel section opening radially outwards. The core is built up of two parts, a pole wheel 11 of L section forming one side wall and the bottom of the channel and a pole wheel 12 fastened by screws 13 to the pole wheel 11 to form the second wall of the channel. Around the periphery of each side wall is a ring of uniformly spaced pole-pieces 14, the pole-pieces of one ring being staggered with respect to those of the other. The pole-pieces are provided with fingers 15 extending axially outside the channel so far that the fingers of one ring are interlaced with those of the other. The pole faces lie in a spherical surface. The armature element (not shown) of the clutch surrounds the two rings of pole-pieces.

Figure 2:
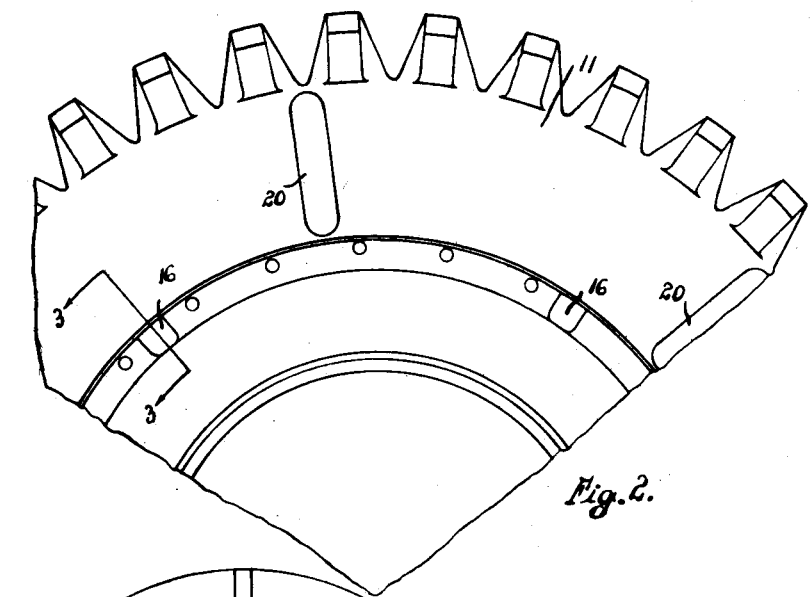
Figure 2 is an end view of a portion of a pole wheel forming part of the field element.
Figure 5:
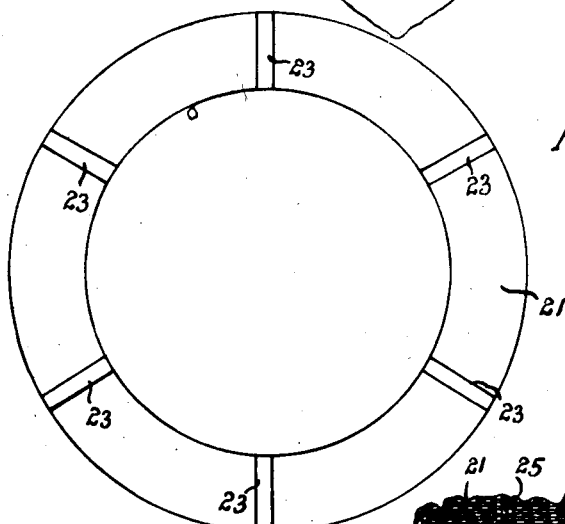
Figure 5 is an end view of a winding of the same field element.
Figure 3:
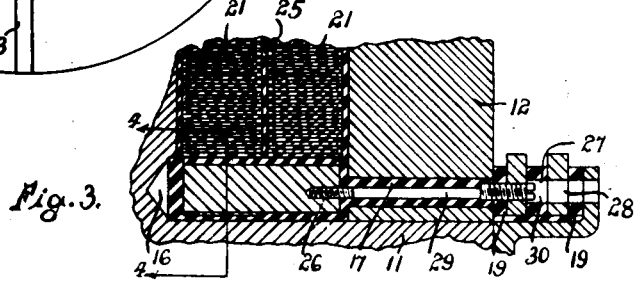
Figure 3 is a section through part of the field element, but taken along a line corresponding to 3—3 in Figure 2.

The bottom of the annular channel is provided with two axial channels 16 (Figure 2) extending across the full width of the annular channel. The axial channels 16 are aligned respectively with two bores such as 17 (Figure 3) passing axially through the pole wheel 12. A pair of insulated slip rings 18 of the same size are mounted side by side adjacent to the pole wheel 12 and spaced from this wheel and from each other by insulating washers 19. The two axial channels 16, the two bores 17 through the pole wheel 12, and the annular channel 10 are lined with insulating material. Each of the side walls of the annular channel 10 is provided with six uniformly spaced radial keyways such as 20, and the insulating lining is omitted in way of the keyways.

The winding consists of two coils 21 of generally similar construction. Each coil is made by winding a copper strip and a woven glass tape slightly wider than the strip together on a former into a two-start spiral. The glass tape extends beyond the borders of the copper strip. The radially inner end part of the copper strip is bent inwards to pass around a terminal block 22 of more or less square section, to which it is electrically bonded, e. g. by solder, the end of the strip being tucked into the coil between the beginnings of the first and second turns. The coil is impregnated with a thermosetting resin solution, e. g. the material supplied by Lewis Berger & Sons Limited, under the trade name "Hymeglass," and thereafter baked to set the resin so that the coil becomes a rigid ring. One side face of the ring is then machined to form in its six keyways 23 adapted to register with the keyways 20 in the side walls of the annular channel 10.

The magnet is assembled by first mounting one of the coils 21 on the pole wheel 11 with its side having the keyway 23 directed towards the end wall of the wheel and with the terminal block 22 in one of the two axial channels 16, the co-operating keyways being fitted with keys 24 of insulating material, e. g. that known by the trade name "Tufnol Whale." Thereafter the second coil 21 is mounted alongside the first, with an insulating washer 25 between the two coils. The keyways 23 of the second coil face outwards and its terminal block 22 is in the other of the two axial channels 16. The pole wheel 12 is then fitted, a second set of insulating keys 24 being placed in the co-operating keyways. The terminal blocks 22 extend for the full length of the axial channels 16 measured within the insulating linings at their ends. Each terminal block has an internally screw-threaded bore 26 opening axially at its end nearer to the removable side wall of the core.

The slip rings 18 and their spacing washers 19 having been fitted, the electrical connections between the slip rings 18 and the terminal blocks 22 are effected as follows. The electrical connection between only one of the slip rings and its associated terminal block is shown but it will be apparent that the other connection is similarly effected. The two slip rings have respectively two internally screw-threaded holes 27 aligned respectively with the bores 26 in the terminal blocks. The pitch of the threads in the slip rings is finer than that of the threads in the terminal blocks, and the diameter of the threads in the slip rings is larger than that of the threads in the blocks. The pitches are of the same hand. Each slip ring has a hole 28 of clearance diameter drilled through it in alignment with the threaded hole in the other ring. Two differential tie screws 29 of different lengths are provided with grub heads 30 threaded to fit the threaded holes 27 in the slip rings and tails threaded to fit the threaded holes 26 in the terminal blocks. The shorter tie screw is passed through the clearance hole 28 in the outer slip ring, through the threaded hole 27 in the inner slip ring and through the pole wheel 12 and rotated to engage its screwed head 30 with the thread in the inner slip ring; as rotation of the screw continues, its tail engages the screwed hole 26 in the appropriate terminal block 24, and the differential action of the threads puts the screw under tension and ensures good electrical conductivity at its junctions with the block and the slip ring. The longer tie screw is inserted through the threaded hole 27 in the outer slip ring and the clearance hole 28 in the inner slip ring and through the pole wheel 12 and tightened, similarly to the first screw, into the other terminal block 22. The two coils are mounted with their spirals running in opposite hands, and the outer ends of the coils are strapped together.

I claim:

1. An electromagnet for use as a rotary part of a dynamoelectric machine and of the kind having an annular magnetic core the section of which partly surrounds the section of an annular exciting winding, the said winding comprising a strip of metal wound into a tight spiral to form a ring coil of rectangular section in which the turns are separated by insulation, and the coil being locked to an adjacent surface of the magnetic core by at least one key of insulating material disposed at least in part radially and engaged in keyways formed in a side of the coil and in the core.

2. An electromagnet for use as a rotary part of a dynamoelectric machine and of the kind having an annular magnetic core the section of which partly surrounds the section of an annular exciting winding, the said winding comprising a strip of metal wound into a tight spiral to form a ring coil of rectangular section in which the turns are separated by insulation, and the coil being locked to an adjacent surface of the magnetic core by a plurality of keys of insulating material disposed at least in part radially and uniformly distributed around the coil.

3. An electromagnet for use as a rotary part of a dynamoelectric machine and of the kind having an annular magnetic core the section of which partly surrounds the section of an annular exciting winding, the said winding consisting of two ring coils wound in spirals of opposite hand and placed side by side in an annular groove of rectangular channel section opening radially outwards in the core, each of said coils comprising a strip of metal wound into a tight spiral in which the turns are separated by insulation and being locked to an adjacent surface of the magnetic core by at least one key of insulating material disposed at least in part radially and engaged in keyways formed in a side of the coil and in the core, the outer ends of the two coils being electrically bonded together, and the inner ends of the two coils forming the terminals of the winding.

4. An electromagnet for use as a rotary part of a dynamoelectric machine and of the kind having an annular magnetic core the section of which partly surrounds the section of an annular exciting winding, the said winding comprising a strip of metal wound into a tight spiral to form a ring coil of rectangular section in which the turns are separated by insulation, the coil being locked to an adjacent surface of the magnetic core by at least one key of insulating material disposed at least in part radially and engaged in keyways formed in a side of the coil and in the core, and a connection for the radially inner terminal of the ring coil including a terminal block to which the inner end of a conductor strip is bonded and which lies in an axially disposed channel opening in a cylindrical surface of the core around which the coil is disposed, a conductor member adjacent to a side wall of the core, and a conducting tie passing through said side wall and engaged in said terminal block and said conductor member, the terminal block, the tie and the conductor member being insulated from the core.

5. An electromagnet for use as a rotary part of a dynamoelectric machine and of the kind having an annular magnetic core the section of which partly surrounds the section of an annular exciting winding, the said winding comprising a strip of metal wound into a tight spiral to form a ring coil of rectangular section in which the turns are separated by insulation, the coil being locked to an adjacent surface of the magnetic core by at least one key of insulating material disposed at least in part radially and engaged in keyways formed in a side of the coil and in the core, a connection for the radially inner terminal of the ring coil including a terminal block to which the inner end of a conductor strip is bonded and which lies in an axially disposed channel opening in a cylindrical surface of the core around which the coil is disposed, a conductor member adjacent to a side wall of the core, and a conducting tie passing through said side wall, said tie consisting of a differential screw engaged in two screw-threaded holes of different diameters and pitches in the terminal block and conductor member respectively, the terminal block, the tie and the conductor member being insulated from the core.

ACHILLE CARLO SAMPIETRO,
*known as Achilles Charles Sampietro.*

REFERENCES CITED

The following references are of record in the file of this patent:

UNITED STATES PATENTS

| Number | Name | Date |
| --- | --- | --- |
| 2,357,517 | Burdick | Sept. 5, 1944 |
| 2,439,230 | Weyandt | Apr. 6, 1948 |
| 2,465,982 | Winther | Mar. 29, 1949 |